Figure 1:
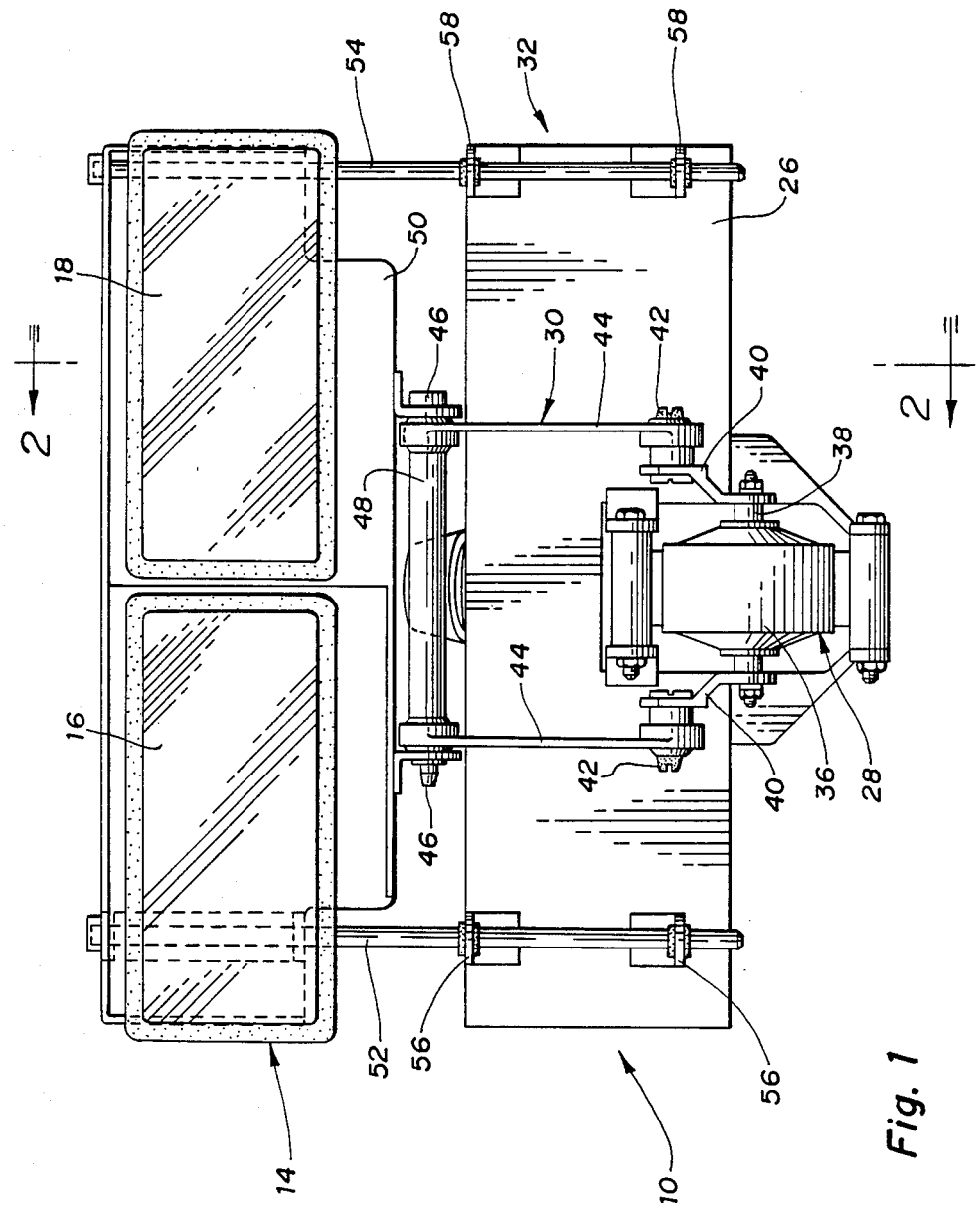

United States Patent [19]

Antrim

[11] Patent Number: 4,860,175

[45] Date of Patent: Aug. 22, 1989

[54] ACTUATOR MECHANISM FOR HEADLAMP

[75] Inventor: Marcus L. Antrim, Yorktown, Ind.

[73] Assignee: General Motors Corporation, Detroit, Mich.

[21] Appl. No.: 232,087

[22] Filed: Aug. 15, 1988

[51] Int. Cl.⁴ .............................................. B60Q 1/06
[52] U.S. Cl. ...................................... 362/65; 362/286; 362/386
[58] Field of Search .................. 362/64, 65, 233, 285, 362/286, 418, 386

[56] References Cited

U.S. PATENT DOCUMENTS 2,338,541  1/1944  Roedding .............................. 362/65
4,516,191  5/1985  Moriyama et al. ................... 362/65

Primary Examiner—Stephen F. Husar
Attorney, Agent, or Firm—Edward J. Biskup

[57] ABSTRACT

An actuator mechanism for moving a headlamp in a vertical direction between an exposed position and a concealed position in which the headlamp is attached to a pair of laterally spaced parallel rods for guiding the headlamp as it is moved between the aforementioned positions.

8 Claims, 2 Drawing Sheets

ACTUATOR MECHANISM FOR HEADLAMP

This invention concerns concealable headlamp assemblies in general and more particularly relates to an actuator mechanism for moving a headlamp assembly from a concealed position to an exposed position.

More specifically, the actuator mechanism made in accordance with the present invention is combined with the body of a motor vehicle and serves to move a headlamp assembly between a first position wherein the headlamp is exposed to project a beam of light forwardly of the vehicle and a second position wherein the headlamp is concealed within the body of the motor vehicle. The actuator mechanism includes guide means attached to the vehicle body for supporting the headlamp assembly for movement along a vertical axis as the headlamp assembly is driven between the exposed and concealed positions. In the preferred form, the guide means takes the form of a pair of laterally spaced and vertically orientated rods to which the headlamp assembly is attached. The rods are slidingly received by a support bracket rigidly fastened to the vehicle body that also supports an electric motor and linkage arrangement that is connected to the headlamp assembly and serves to move the latter between the aforementioned exposed and concealed positions.

The objects of the present invention are to provide a new and improved actuator mechanism for moving a motor vehicle headlamp assembly along a straight line between an exposed position and a concealed position; to provide a new and improved actuator mechanism for moving a headlamp assembly in a vertical direction between an exposed position and a concealed position and in which the headlamp assembly is attached to a pair of laterally spaced rods for guiding the headlamp assembly as it is moved between the aforementioned positions; to provide a new and improved actuator mechanism for a concealable headlamp assembly that includes a common bracket attachable to the vehicle body for supporting the guide means and drive means which serve to allow the headlamp assembly to be translated vertically between concealed and exposed positions; and to provide a new and improved modular actuator mechanism for a concealable headlamp assembly that includes a support bracket having a centrally mounted motor and laterally spaced bearing means for slidingly supporting a pair of parallel rods the upper ends of which carry the headlamp assembly for movement in a linear direction between an exposed position wherein the headlamp assembly projects a beam of light forwardly of the vehicle and a concealed position wherein the headlamp assembly is located within the body of the vehicle.

Figures 2, 3:
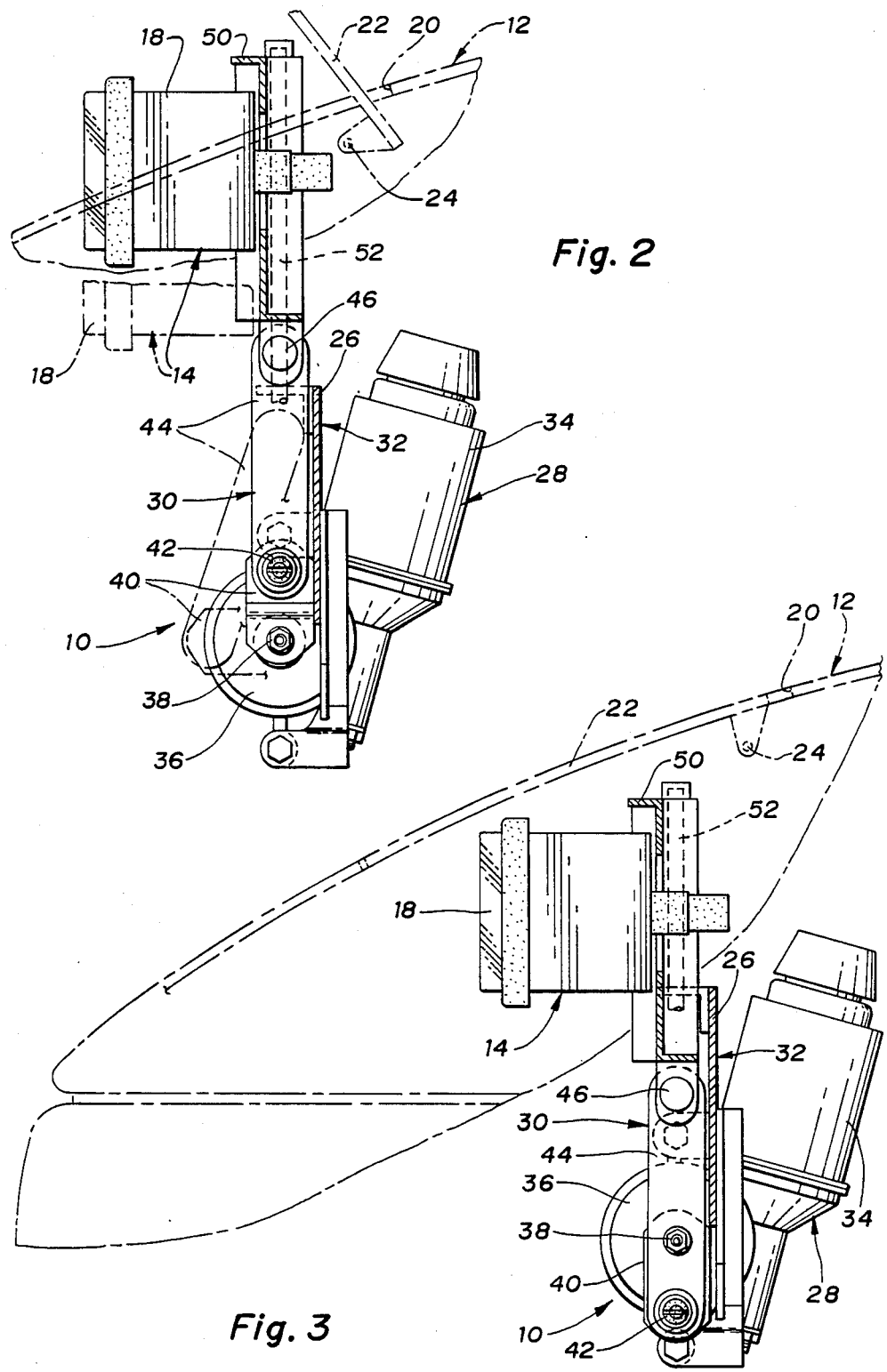

The objects and advantages of the present invention will be apparent upon reading the following detailed description when taken with the drawings in which FIG. 1 is a front elevational view showing an actuator mechanism according to the present invention in which the headlamp assembly is located in the exposed position;

FIG. 2 is a side elevational view of the actuator mechanism taken on line 2—2 of FIG. 1; and FIG. 3 is a view of the actuator mechanism similar to the view shown in FIG. 2 except that the headlamp assembly is located in the concealed position.

Referring now to the drawings, an actuator mechanism 10 according to the present invention is shown mounted within the front end of the body 12 of a vehicle for moving a headlamp assembly 14 between a concealed position shown in FIG. 3 and an exposed position shown in FIGS. 1 and 2. As should be apparent, when the headlamp assembly 14 is located in the concealed position of FIG. 3, the headlamps 16 and 18 are positioned below an opening 20 formed in the vehicle body 12 which is adapted to be closed by a cover 22. The cover 22 is pivotally connected at its rear end to the vehicle body 12 by a pivotal connection 24 which allows the cover 22 to move about a horizontal axis between the closed position of FIG. 3 and the open position shown in FIGS. 1 and 2. Although not shown, the cover 22 can be connected by a linkage or the like to the headlamp assembly 14 so as the latter moves between its concealed and exposed positions, the cover 22 will move between the closed and opened positions, respectively.

The actuator mechanism 10 is supported by a mounting plate 26, which in turn, is adapted to be rigidly mounted to the vehicle body 12. More specifically, the actuator mechanism 10 is modular in form and includes an electric drive system 28, a linkage arrangement 30, and a guide system 32 for controlling movement of the headlamp assembly 14 between the concealed and exposed positions mentioned above.

The electric drive system 28 comprises a reversible electric motor 34 which is directly connected to a reduction gearing arrangement located within a gear housing 36. Although not shown, the output shaft of the electric motor 34 drives a worm which in turn drives a worm gear rotatably supported in the gear housing 36. The worm gear is connected to a drive shaft 38 which extends laterally outwardly from the opposed sides of the housing 36 for connection with the linkage arrangement 30. In this regard, each end of the shaft 38 has an identical crank 40 fixed thereto which in turn is connected by a pivotal connection 42 to one end of a link 44. The other end of each link 44 is connected by a pivotal connection 46 to a cross shaft 48 which carries a support plate 50. The support plate 50, in turn, carries headlamps 16 and 18 which serve to project a beam of light forwardly of the vehicle when located in the exposed position of FIGS. 1 and 2. In addition, the support plate 50 is rigidly connected to the upper ends of a pair of identical vertically orientated and parallel guide rods 52 and 54. The lower ends of the guide rods 52 and 54 are slidingly received by guide rod bearing members 56 and 58, respectively, carried by the plate 26.

From the above description, it should be apparent that when the headlamps 16 and 18 are in the exposed position of FIG. 2, the crank 40 and link 44 have the centers of their pivotal connections 38, 42 and 46 aligned along a vertical axis. When it is desired to place the headlamp assembly 14 in a concealed position, the electric motor 34 is energized causing the crank 40 to rotate in a counterclockwise direction so that the headlamp assembly 14 and the linkage arrangement 30 move to the intermediate position indicated by the phantom lines and then finally to the concealed position of FIG. 3 wherein the centers of the pivotal connections 42 and 46 are again aligned with the center of the output shaft 38 of the reduction gearing. In this position, the headlamp assembly 14 is located within the body 12 of the vehicle and the cover 22 is closed to conceal the headlamp assembly 14. As is conventional with an actuator mechanism of this type, when the headlamp assembly 14 reaches the fully concealed position of FIG. 3, a limit switch (not shown) deenergizes the motor 34 so that further rotation of the crank 40 is discontinued. In addition, when the motor 34 is subsequently energized, the crank 40 will be driven in a clockwise direction, as seen in FIG. 3, to return the headlamp assembly 14 from the concealed position to the exposed position of FIGS. 1 and 2. When the headlamp assembly 14 assumes the exposed position, a second limit switch (not shown) again deenergizes the motor 34.

Various changes and modifications can be made in the construction described above without departing from the spirit of the invention. Since such changes and modifications are contemplated by the inventor, he does not wish to be limited except by the scope of the appended claims.

The embodiments of the invention in which an exclusive property or privilege is claimed are defined as follows:

1. In combination with a motor vehicle, an actuator mechanism for moving a headlamp assembly between a first position wherein said headlamp assembly is exposed to project a beam of light forwardly of said motor vehicle and a second position wherein said headlamp assembly is concealed within the body of said motor vehicle, said actuator mechanism including guide means attached to said body for supporting said headlamp assembly for movement along a vertical axis from said first position to said second position and vice versa, and drive means connected to said headlamp assembly for moving said headlamp assembly between said first and second positions while being guided by said guide means.

2. In combination with a motor vehicle, a modular actuator mechanism for moving a headlamp assembly between a first position wherein said headlamp assembly is exposed to project a beam of light forwardly of said motor vehicle and a second position wherein said headlamp assembly is concealed within the body of said motor vehicle, said actuator mechanism including a mounting plate adapted to be fixed to said body and having guide means attached thereto for supporting said headlamp assembly for movement along a vertical axis from said first position to said second position and vice versa, and drive means carried by said mounting plate and connected to said headlamp assembly for moving said headlamp between said first and second positions while being guided by said guide means.

3. In combination with a motor vehicle, a modular actuator mechanism for moving a headlamp assembly between a first position wherein said headlamp assembly is exposed to project a beam of light forwardly of said motor vehicle and a second position wherein said headlamp assembly is concealed within the body of said motor vehicle, said actuator mechanism including a mounting plate adapted to be fixed to said body, a guide means in the form of a pair of parallel rods attached to said mounting plate for supporting said headlamp assembly for movement along a vertical axis from said first position to said second position and vice versa, and drive means carried by said mounting plate and connected to said headlamp assembly for moving said headlamp assembly between said first and second positions while being guided by said guide means.

4. The combination of claim 3 wherein said drive means included an electric reversible motor and reduction gearing.

5. The combination of claim 3 wherein said drive means includes an electric reversible motor and reduction gearing connected through a linkage arrangement to said headlamp assembly.

6. The combination of claim 5 wherein said linkage arrangement includes a crank driven by said reversible motor and an intermediate link pivotally connected between said crank and said headlamp assembly.

7. The combination of claim 6 wherein said reduction gearing has an output shaft to which said crank is fixed and one end of said crank is connected to one end of said intermediate link by a first pivotal connection and the other end of said intermediate link is connected to said headlamp assembly by a second pivotal connection.

8. The combination of claim 7 wherein the center of said output shaft, the center of said first connection, and the center of said second pivotal connection are all aligned along a vertical axis when said headlamp assembly is in said first position and in said second positions.

* * * * *